United States Patent
Shamasundar et al.

(10) Patent No.: US 11,257,388 B2
(45) Date of Patent: Feb. 22, 2022

(54) OBSTRUCTION DETECTION AND WARNING SYSTEM AND METHOD

(71) Applicant: HONEYWELL INTERNATIONAL INC., Morris Plains, NJ (US)

(72) Inventors: Raghu Shamasundar, Bangalore (IN); Prashanth Thirumalaivenjamur, Bangalore (IN); Umesh Hosamani, Bangalore (IN); Arivazhagan V, Bangalore (IN); Akshay Sankeshwari, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 292 days.

(21) Appl. No.: 16/668,853

(22) Filed: Oct. 30, 2019

(65) Prior Publication Data

US 2021/0134166 A1    May 6, 2021

(51) Int. Cl.
  *G08G 5/00* (2006.01)
  *G08G 5/04* (2006.01)
  *G08G 5/02* (2006.01)
  *B64F 1/20* (2006.01)

(52) U.S. Cl.
  CPC .............. *G08G 5/045* (2013.01); *B64F 1/20* (2013.01); *G08G 5/003* (2013.01); *G08G 5/0026* (2013.01); *G08G 5/0069* (2013.01); *G08G 5/025* (2013.01)

(58) Field of Classification Search
  None
  See application file for complete search history.

(56) References Cited

U.S. PATENT DOCUMENTS

| | | | | |
|---|---|---|---|---|
| 4,590,501 | A * | 5/1986 | Scholl | H01L 33/0008 257/103 |
| 4,766,470 | A * | 8/1988 | Scholl | H01L 33/0025 257/94 |
| 4,937,638 | A * | 6/1990 | Butlin | H01L 33/20 257/103 |
| 6,900,742 | B2 * | 5/2005 | Chesney, II | B64F 1/20 340/644 |
| 7,057,549 | B2 * | 6/2006 | Block | G01S 13/935 342/65 |
| 8,232,910 | B1 * | 7/2012 | Burton | G01S 7/412 342/29 |
| 8,234,058 | B1 * | 7/2012 | Barber | G08G 5/0086 701/120 |

(Continued)

*Primary Examiner* — Aniss Chad
*Assistant Examiner* — Tischi Balachandra
(74) *Attorney, Agent, or Firm* — Lorenz & Kopf, LLP

(57) ABSTRACT

An obstruction detection and warning system includes a plurality of edge light emitters, and a processing system. The edge light emitters are mounted on a structure that has a width and a height. Each edge light emitter is operable to emit a light beam at an angular rate, and that is encoded with data that indicates its position and its height. The processing system receives the light beam emitted from each edge light emitter and decodes the encoded data from the received light beam to determine the width and height of the structure, and to determine a distance from an aircraft to the structure. The processor also compares an active trajectory and current altitude of the aircraft to the width and height of the structure and the distance to the structure and, based on the comparison, generates and supplies situational cues to an operator of the aircraft.

20 Claims, 2 Drawing Sheets

(56) References Cited

U.S. PATENT DOCUMENTS

| | | | | |
|---|---|---|---|---|
| 8,581,748 B1* | 11/2013 | Barber | G08G 5/025 | 340/971 |
| 9,013,331 B2* | 4/2015 | Wise | F21V 7/041 | 340/961 |
| 9,245,450 B1* | 1/2016 | Chiew | G08G 5/0047 | |
| 9,262,932 B1* | 2/2016 | Barber | G06T 15/20 | |
| 9,280,904 B2* | 3/2016 | Bourret | G08G 5/025 | |
| 9,342,988 B2* | 5/2016 | Bourret | G08G 5/0021 | |
| 9,561,868 B2* | 2/2017 | Bourret | B64C 13/18 | |
| 9,581,692 B2* | 2/2017 | Lamkin | G08G 5/0021 | |
| 10,450,082 B1* | 10/2019 | Blanton | G08G 5/0013 | |
| 10,532,825 B2* | 1/2020 | Blanton | G08G 5/0047 | |
| 10,739,792 B2* | 8/2020 | Cherepinsky | G05D 1/102 | |
| 10,794,727 B2* | 10/2020 | Bourret | G01C 21/04 | |
| 2006/0170568 A1* | 8/2006 | Malhomme | B64F 1/36 | 340/981 |
| 2007/0069228 A1* | 3/2007 | Miller | H01L 33/46 | 257/98 |
| 2007/0241933 A1* | 10/2007 | Price | G01S 7/481 | 340/904 |
| 2014/0186026 A1* | 7/2014 | Oshima | H04B 10/116 | 398/25 |
| 2017/0162068 A1* | 6/2017 | Guignard | G01C 23/00 | |
| 2017/0293034 A1* | 10/2017 | Otsubo | G01S 19/31 | |
| 2018/0012500 A1* | 1/2018 | Britan | G08G 5/025 | |
| 2018/0101173 A1* | 4/2018 | Banerjee | H04N 5/23248 | |
| 2018/0159303 A1* | 6/2018 | Kim | F21V 5/043 | |
| 2018/0308298 A1* | 10/2018 | Eluganti | G01S 1/50 | |
| 2019/0144111 A1* | 5/2019 | Apostolopoulos | G01S 13/913 | 701/17 |
| 2019/0315486 A1* | 10/2019 | Martin | B64C 39/024 | |
| 2020/0341117 A1* | 10/2020 | Sandford | G01S 17/87 | |
| 2021/0019699 A1* | 1/2021 | Bornski | G08G 5/025 | |

* cited by examiner

OBSTRUCTION DETECTION AND WARNING SYSTEM AND METHOD

TECHNICAL FIELD

The present invention generally relates to obstruction detection and warning, and more particularly relates to detecting and warning of obstructions using light emitted from obstructions.

BACKGROUND

Traffic congestion in densely populated areas has prodded research into alternate transportation platforms. One such alternative transportation platform is referred to as urban air mobility. Urban air mobility (UAM) refers to the use of relatively small, relatively lightweight aircraft (either manned or unmanned) to transport passengers between destinations in the same urban area. It is envisioned that such aircraft, which are sometimes referred to as "air taxis," may use high rise rooftops or other relatively tall structures (e.g., parking garages) as landing/takeoff locations and where passengers would embark to and disembark from the aircraft.

It is further envisioned that UAM aircraft will be operated at relatively low altitudes that are not within the jurisdiction of governmental regulatory authorities, such as the Federal Aviation Administration (FAA). In many instances, the operational altitudes may be below the maximum height of buildings or other structures in the urban area being served. Thus, the ability to detect and avoid potential obstructions, such as buildings and other structures, in real-time will be of utmost importance.

One proposed solution to obstruction detection is the use of an on-board terrain and obstacle databases. Unfortunately, this solution has some associated drawbacks. For example, the databases would need to be maintained and updated at set periodicities. Moreover, there would not be a redundant method to validate the database information during the flight.

Hence, there is a need for a system and method for detecting potential obstructions in the flight path of UAM aircraft that does not rely on terrain and obstacle databases. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an obstruction detection and warning system includes a plurality of edge light emitters, and a processing system. The edge light emitters are mounted on a structure that has a width and a height. Each edge light emitter is mounted on the structure at a position relative to a reference position and at a height above ground level, and each edge light emitter is operable to emit a light beam at an angular rate, and the light beam is encoded with data that indicates its position and its height. The processing system is for receiving the light beam emitted from each edge light emitter and is operable, upon receipt of the light beam emitted from each edge light emitter, to decode the encoded data from the received light beam to determine the width and height of the structure, and to determine a distance from an aircraft to the structure. The processor is also operable to compare an active trajectory and current altitude of the aircraft to the width and height of the structure and the distance to the structure and, based on the comparison, generate and supply situational cues to an operator of the aircraft.

In another embodiment, a method of providing obstruction detection and warning includes emitting a light beam, at an angular rate, from each of a plurality of edge light emitters, where each edge light emitter is mounted on a structure that has a width and a height, and each edge light emitter is mounted on the structure at a position relative to a reference position and at a height above ground level, and where the light beam emitted from each edge light emitter encoded with data that indicates its position and its height. The light beam emitted from each edge light emitter is received, and the encoded data is decoded from the received light beam to determine the width and height of the structure, and to determine a distance from an aircraft to the structure. An active trajectory and current altitude of the aircraft is compared to the width and height of the structure and the distance to the structure and, based on the comparison, situational cues are generated and supplied to an operator of the aircraft.

In yet another embodiment, an obstruction detection and warning system, includes a plurality of edge light emitters, a display device, and a processing system. The edge light emitters are mounted on a structure that has a width and a height. Each edge light emitter is mounted on the structure at a position relative to a reference position and at a height above ground level, and each edge light emitter is operable to emit a light beam at an angular rate, and the light beam is encoded with data that indicates its position and its height. The display device is responsive to commands to render one or more images. The processing system is in operable communication with the display device and is configured to receive the light beam emitted from each edge light emitter. The processing system is operable, upon receipt of the light beam emitted from each edge light emitter, to: decode the encoded data from the received light beam to determine the width and height of the structure, and to determine a distance from an aircraft to the structure, compare an active trajectory and current altitude of the aircraft to the width and height of the structure and the distance to the structure, based on the comparison, generate situational cues for use by an operator of the aircraft, and supply commands to the display device that cause the display device to render one or more images of the situational cues.

Furthermore, other desirable features and characteristics of the obstruction detection and warning system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
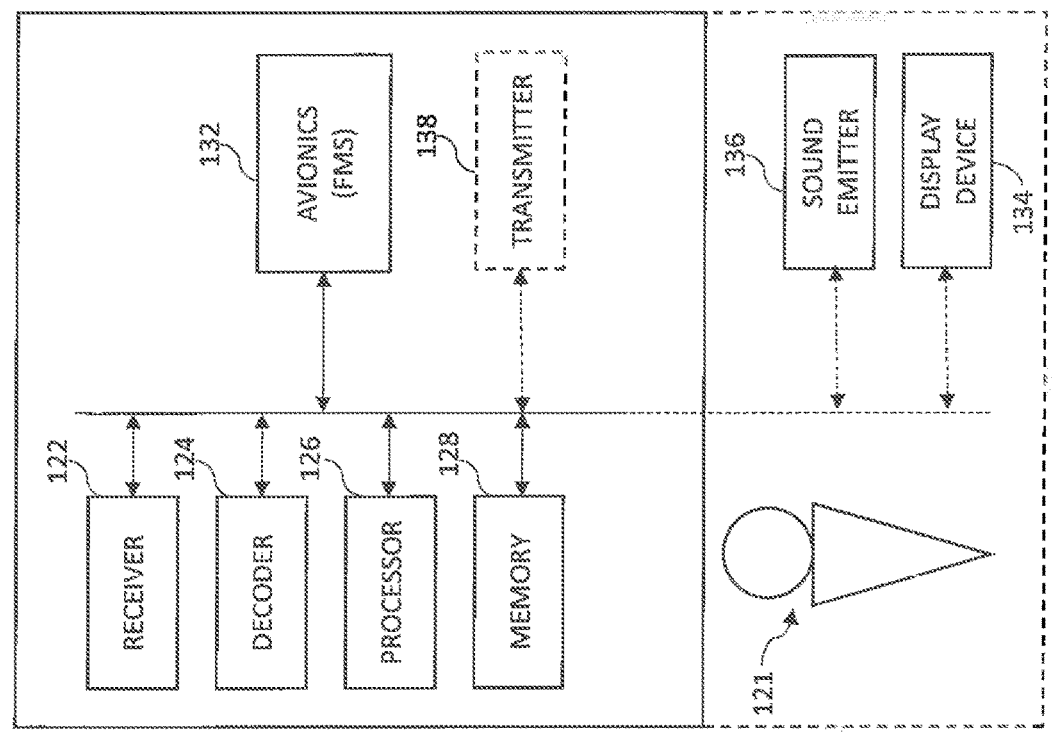
FIG. 1 a functional block diagram of one embodiment of an obstruction detection and warning system.
Figure 1:
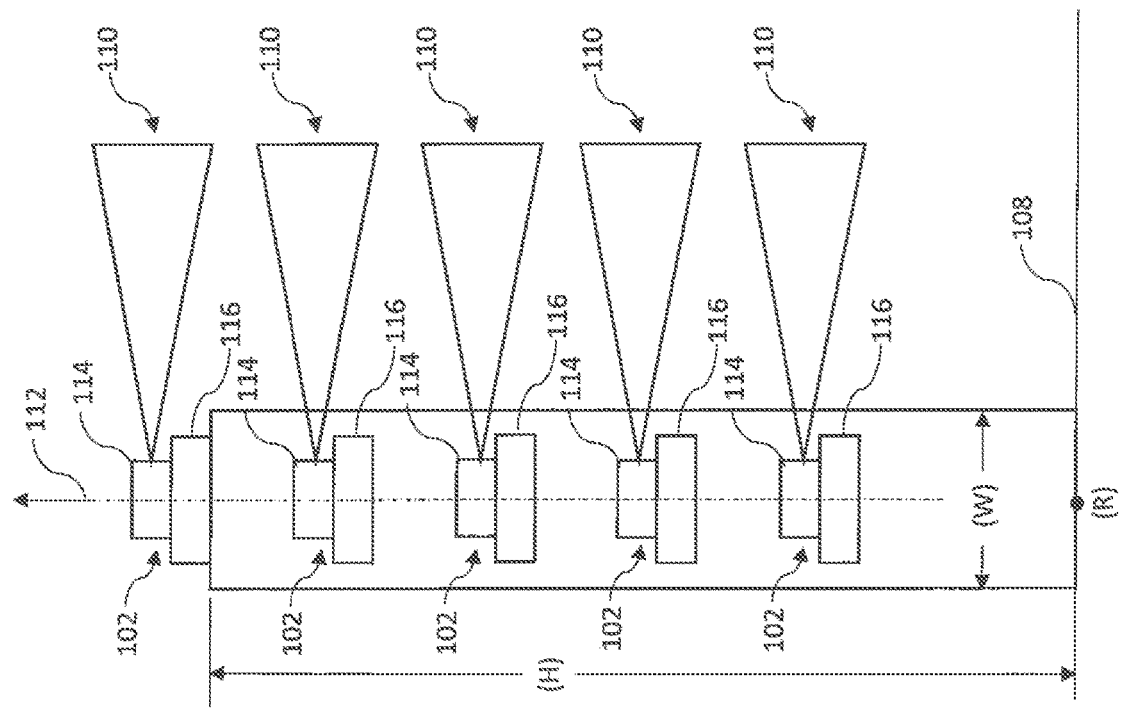

Referring to FIG. 1, a functional block diagram of one embodiment of an obstruction detection and warning system is depicted. The depicted system 100 includes a plurality of edge light emitters 102 and a processing system 104. Each of the edge light emitters 102 is mounted on a structure 106. Although FIG. 1 depicts only a single structure 106 having the edge light emitters 102 disposed thereon, it will be appreciated that this is done for clarity and ease of depiction and illustration. It will be appreciated that a plurality of structures 106 may have one or more of the edge light emitters 102 disposed thereon. Indeed, before proceeding further, it is noted that governmental regulatory bodies, such as the Federal Aviation Administration (FAA) and the International Civil Aviation Organization (ICAO), promulgate regulations that require all structures having a height that exceeds 200 feet (61 meters) above ground level to be marked with lighting. The edge light emitters 102 disclosed herein may be used to meet this marking requirement.

Returning again to the description, as FIG. 1 illustrates, the structure 106 has a width (W) and a height (H). Each edge light emitter 102 is mounted on the structure 106 at a position relative to a reference position (R) and at a height above ground level 108. Although the reference position (R) in the depicted embodiment is illustrated as being at particular position on the ground level 108, it will be appreciated that this is merely exemplary and that the reference position (R) could be located at any one of numerous positions.

As FIG. 1 further depicts, each edge light emitter 102 is also operable to emit a light beam 110 at an angular rate around an axis of rotation 112. To implement this functionality, each edge light emitter 102 may include a non-illustrated motor that causes physical rotation around the axis of rotation 112, or each edge light emitter 102 may be controlled in a manner that causes the light beam 110 it emits to rotate around the axis of rotation 112. For example, each edge light emitter 102 may include a plurality of lights that are selectively energized in a manner that causes the emitted light beam 110 to rotate.

Regardless of the technique that is used to rotate the emitted light beam 110 around the axis of rotation 112, it is noted that the term "edge light emitter" refers to an intelligent light emitting device that is not just operable to emit a light beam, but is also capable of receiving, processing, and broadcasting information. Indeed, in the depicted embodiment, each edge light emitter 102 is operable to emit a light beam 110 that is encoded with data that indicates its position and its height. Each edge light emitter 102 may be variously configured to implement its functionality. In the depicted embodiment, however, each edge light emitter 102 includes a plurality of light emitting diodes (LEDs) 114 and a microcontroller 116. The microcontroller 116 is coupled to the LEDs 114 and is configured to drive each of the LEDs 114 in a manner that causes the edge light emitter 102 to emit the light beam 110 with the encoded data.

The processing system 104 may be wholly or partially disposed within an aircraft 120. In other embodiments, the processing system 104 may be wholly or partially disposed remote from the aircraft 120. The aircraft 120 may be implemented using any one of numerous types of jet aircraft or non-jet aircraft, such as a rotorcraft, and it may be either a manned aircraft or an unmanned aircraft. The aircraft 120, whether manned or unmanned, may also be configured to carry payload, such as various types and sizes of cargo, or passengers, or both.

Figure 2:
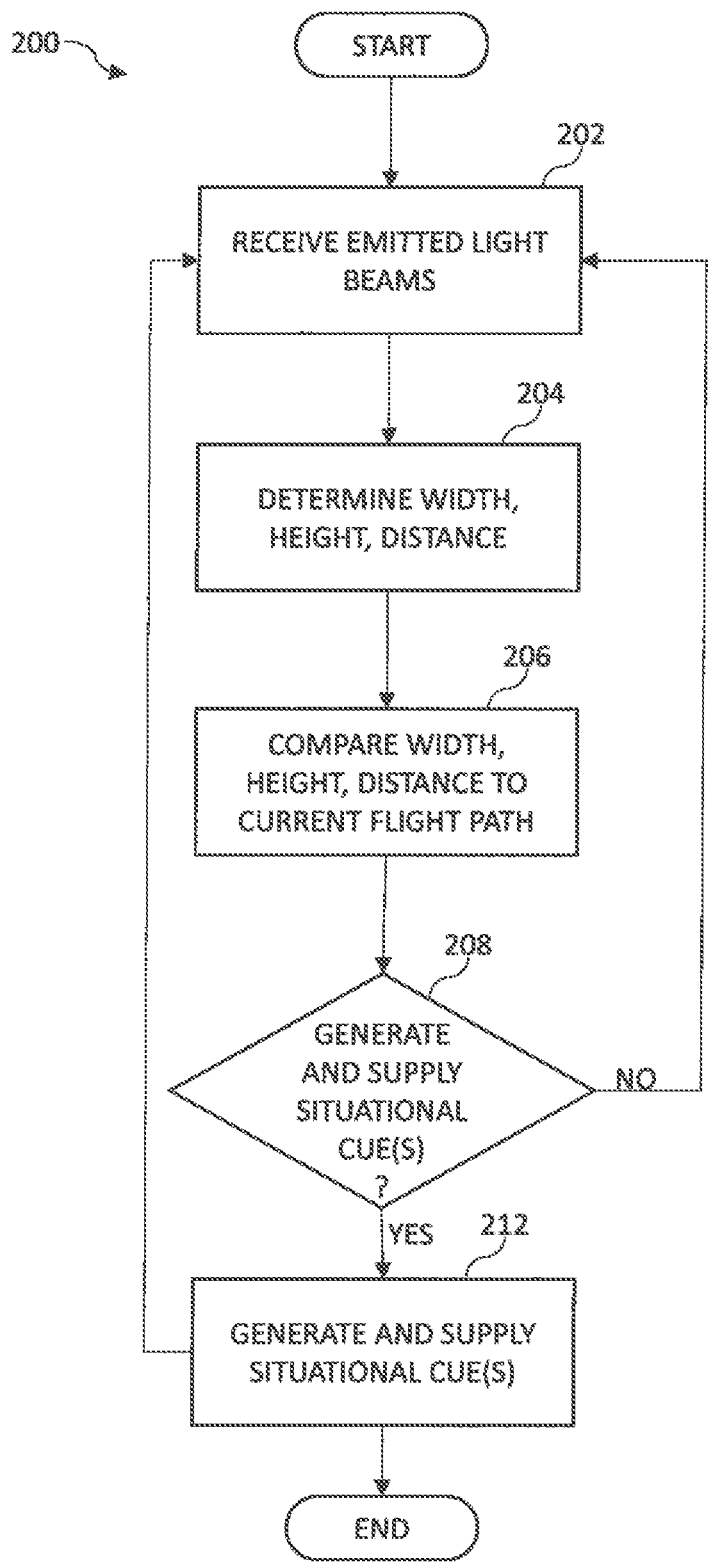
FIG. 2 depicts a process, in flowchart form, that may be implemented by the system of FIG. 1.

Regardless of the type of aircraft 120, the processing system 104 receives the light beam emitted 110 from each edge light emitter 102, upon receipt of the light beam 110 emitted from each edge light emitter 102, implements a method of providing obstruction detection and warning for the aircraft 120. This method 200 is depicted in flowchart form in FIG. 2 and will now be described in more detail. In doing so, it should be noted that the parenthetical references in the following description refer to like numbered blocks in the flowchart depicted in FIG. 2.

The method 200 begins upon receiving, in the processing system 104, the light beam emitted from each edge light emitter 102 (202). The encoded data in each light beam is decoded, in the processing system 104, to determine the width and height of the structure 106, and to determine the distance from the aircraft 120 to the structure (204). A comparison is made, in the processing system 104, of the Active trajectory and current altitude of the aircraft 120 to the width and height of the structure 106 and the distance to the structure 106 (206). Based on this comparison, the processing system 104 determines whether to generate and supply one or more situational cues to an operator 121 of the aircraft 120 (208). If the determination is positive (e.g., YES), then the processing system 104 does indeed generate and supply the one or more situational cues (212), and then continues with the method 200. If the determination is negative (e.g., NO), no situational cues are generated and the method 200 is continued.

The processing system 104, as may be appreciated, may be variously configured to implement the functionality described above. In the embodiment depicted in FIG. 1, to which reference should be returned, the processing system 104 includes a light receiver 122, a decoder 124, and one or more suitably programmed processors 126 (only one depicted for clarity). The light receiver 122, which may be implemented using any one of numerous known light receiver devices, receive the light beam 110 emitted from each light emitter 102 and supplies the received light beam to the decoder 124.

The decoder 124, which may be implemented using any one of numerous light decoders, is operable to decode the encoded data from the received light beam 110, and to supply the decoded data to the processor 126. It should be noted that although the decoder 124 is depicted in FIG. 1 as being implemented separate from the processor 126, its functionality may, at least in some embodiments, be implemented in the processor 126.

The processor 126 is configured to use the decoded data supplied from the decoder 124 to determine the width and height of the structure 106, and to also determine the distance from the aircraft 120 to the structure 106. The processor 126 may use any one of numerous known signal processing techniques to make these determinations. One example of a suitable signal processing technique is the well-known autocorrelation technique. The processor 126 may implement its functionality by, for example, executing instructions stored in a memory 128.

As was noted above, the processing system 104 also compares the aircraft's Active trajectory and current altitude to the width and height of the structure 106 and to the distance to the structure 106 and, based on this comparison, may generate and supply situational cues to the operator 121 of the aircraft 120. As may be appreciated, the active trajectory and current altitude of the aircraft are preferably supplied from an onboard avionics system 132, such as a flight management system (FMS), that is in operable communication with the processing system 104.

The situational cues supplied to the operator 121 may be visual, aural, or both. Thus, as FIG. 1 also depicts, the system 100 may additionally include a display device 134, a sound emitter 136, or both. The display device 134, when included, is in operable communication with the processing system 104 and is configured, in response to commands received from the processing system 104, to render one or more images of the situational cues. The sound emitter 136, when included, is in operable communication with the processing system 104 and is configured, in response to commands received from the processing system 104, to aurally emit one the situational cues.

It should be noted that the operator 121 may be located within the aircraft 120, if it is a manned aircraft, or located remote from the aircraft 120, if it is an unmanned aircraft. Moreover, because the display device 134 and sound emitter 136 are preferably collocated with the operator 121, these components, too, may be located within or remote from the aircraft 120. As such, the dashed lines surrounding the operator 121, the display device 134, and the sound emitter 136 in FIG. 1 are meant to depict these optional locations.

As may be appreciated, when the display device 134 and sound emitter 136 are disposed within the aircraft 120, each may be in operable communication with the processor 126 via wired or wireless connections. When these components 134, 136 are disposed remote from the aircraft 120, the processor 126 may be in operable communication with an optional transmitter 138. The transmitter 138, when included, is configured to receive the situational cues from the processor 126 and transmit the situational cues to the display device 134 and/or sound emitter 136.

The situational cues supplied by the processing system 104 may vary and may depend, for example, on aircraft speed, altitude, trajectory, and proximity to the obstruction 106. For example, if the aircraft 120 if above the height of the obstruction 106, but its active trajectory, based on the flight plan, would result in a collision with the obstruction 106, the processing system 126 may generate and supply either an obstruction caution or an obstruction warning, depending upon the time to impact. The obstruction caution may be displayed in a first color (such as yellow) whereas the obstruction warning may be displayed in a different, distinguishable color (such as red). The caution or warning may also include a distance and/or time to impact, or various other information useful to the operator. The situational cues may also include a preferred maneuver to avoid the collision. For example, the situational cues may cue the operator 121 to increase aircraft altitude (either immediately or within a prescribed time period), to turn the aircraft 120 in a port or starboard direction (either immediately or within a prescribed time period), or both. As may be appreciated, the specific situational cues and the manner in which each is provided to the operator 121 are numerous and varied.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An obstruction detection and warning system, comprising:
   a plurality of edge light emitters mounted on a structure, the structure having a width and a height, each edge light emitter mounted on the structure at a position relative to a reference position and at a height above ground level, each edge light emitter operable to emit a light beam at an angular rate, the light beam encoded with data that indicates its position and its height;
   a processing system for receiving the light beam emitted from each edge light emitter and operable, upon receipt of the light beam emitted from each edge light emitter, to:
      decode the encoded data from the received light beam to determine the width and height of the structure, and to determine a distance from an aircraft to the structure,
      compare an active trajectory and current altitude of the aircraft to the width and height of the structure and the distance to the structure, and
      based on the comparison, generate and supply situational cues to an operator of the aircraft.

2. The system of claim 1, wherein the processing system comprises:
   a decoder operable to decode the encoded data from the received light beam; and
   a receiver operable to receive the light beam emitted from each light emitter and supply the received light beam to the decoder.

3. The system of claim 1, further comprising:
   a display device in operable communication with the processing system and configured, in response to commands, to render one or more images, wherein the processing system is further operable supply commands to the display device that cause the display device to render one or more images of the situational cues.

4. The system of claim 1, wherein the processing system implements autocorrelation to determine the width and height of the structure and the distance to the structure.

5. The system of claim 1, wherein at least a portion of the processing system is disposed in the aircraft.

6. The system of claim 1, wherein at least a portion of the processing system is disposed remote from the aircraft.

7. The system of claim 1, further comprising:
an avionics system in operable communication with the processing system and operable to supply the active trajectory and current altitude of the aircraft to the processing system.

8. The system of claim 7, wherein the avionics system comprises a flight management system.

9. The system of claim 1, wherein each edge light emitter comprises:
a plurality of light emitting diodes (LEDs); and
a microcontroller coupled to the LEDs and configured to drive each of the LEDs in a manner that causes the edge light emitter to emit the light beam.

10. A method of providing obstruction detection and warning, the method comprising the steps of:
emitting a light beam, at an angular rate, from each of a plurality of edge light emitters, each edge light emitter mounted on a structure that has a width and a height, each edge light emitter mounted on the structure at a position relative to a reference position and at a height above ground level, the light beam emitted from each edge light emitter encoded with data that indicates its position and its height;
receiving, in a processing system, the light beam emitted from each edge light emitter;
decoding, in the processing system, the encoded data from the received light beam to determine the width and height of the structure, and to determine a distance from an aircraft to the structure;
compare, in the processing system, an active trajectory and current altitude of the aircraft to the width and height of the structure and the distance to the structure; and
based on the comparison, generating and supplying, via the processing system, situational cues to an operator of the aircraft.

11. The method of claim 10, wherein the step of decoding comprises using a decoder to decode the encoded data from the received light beam.

12. The method of claim 10, further comprising:
commanding, using the processing system, a display device render one or more images of the situational cues.

13. The method of claim 10, wherein the processing system implements autocorrelation to determine the width and height of the structure and the distance to the structure.

14. The method of claim 10, wherein at least a portion of the processing system is disposed in the aircraft.

15. The method of claim 10, wherein at least a portion of the processing system is disposed remote from the aircraft.

16. The method of claim 10, further comprising:
using an avionics system to supply the active trajectory and current altitude of the aircraft to the processing system.

17. An obstruction detection and warning system, comprising:
a plurality of edge light emitters mounted on a structure, the structure having a width and a height, each edge light emitter mounted on the structure at a position relative to a reference position and at a height above ground level, each edge light emitter operable to emit a light beam at an angular rate, the light beam encoded with data that indicates its position and its height;
a display device responsive to commands to render one or more images; and
a processing system in operable communication with the display device and configured to receive the light beam emitted from each edge light emitter, the processing system operable, upon receipt of the light beam emitted from each edge light emitter, to:
decode the encoded data from the received light beam to determine the width and height of the structure, and to determine a distance from an aircraft to the structure,
compare an active trajectory and current altitude of the aircraft to the width and height of the structure and the distance to the structure,
based on the comparison, generate situational cues for use by an operator of the aircraft, and
supply commands to the display device that cause the display device to render one or more images of the situational cues.

18. The system of claim 17, wherein the processing system comprises:
a decoder operable to decode the encoded data from the received light beam; and
a receiver operable to receive the light beam emitted from each light emitter and supply the received light beam to the decoder.

19. The system of claim 17, wherein the processing system implements autocorrelation to determine the width and height of the structure and the distance to the structure.

20. The system of claim 17, wherein each edge light emitter comprises:
a plurality of light emitting diodes (LEDs); and
a microcontroller coupled to the LEDs and configured to drive each of the LEDs in a manner that causes the edge light emitter to emit the light beam.

* * * * *